(12) United States Patent
Chen et al.

(10) Patent No.: US 11,770,159 B2
(45) Date of Patent: Sep. 26, 2023

(54) FREQUENCY COMPENSATION METHOD AND APPARATUS

(71) Applicant: Huawei Technologies Co., Ltd., Shenzhen (CN)

(72) Inventors: Ying Chen, Hangzhou (CN); Jianwei Zhou, Hangzhou (CN); Hejia Luo, Hangzhou (CN); Xiaolu Wang, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/882,200

(22) Filed: Aug. 5, 2022

(65) Prior Publication Data

US 2022/0376743 A1    Nov. 24, 2022

Related U.S. Application Data

(63) Continuation of application No. PCT/CN2021/071534, filed on Jan. 13, 2021.

(30) Foreign Application Priority Data

Feb. 7, 2020   (CN) .......................... 202010082650.0

(51) Int. Cl.
*H04W 56/00* (2009.01)
*H04B 7/01* (2006.01)
*H04L 5/00* (2006.01)

(52) U.S. Cl.
CPC ............. *H04B 7/01* (2013.01); *H04L 5/0051* (2013.01); *H04W 56/0035* (2013.01); *H04W 56/0045* (2013.01)

(58) Field of Classification Search
CPC ........... H04B 7/01; H04B 7/05; H04L 5/0051; H04L 5/005; H04L 5/0048; H04W 56/003;

(Continued)

(56) References Cited

U.S. PATENT DOCUMENTS

2002/0155862 A1    10/2002 Ormson
2018/0097521 A1*   4/2018 Hammerschmidt .. H03L 7/0805
(Continued)

FOREIGN PATENT DOCUMENTS

CN      101741775 A       6/2010
CN      102724149 A   *  10/2012
(Continued)

OTHER PUBLICATIONS

Nokia et al., "Doppler Compensation, Uplink Timing Advance, Random Access and UE Location in NTN", 3GPP TSG RAN WG1 Meeting #98bis, R1-1911220, Chongqing, China, Oct. 14-20, 2019, 30 pages.

(Continued)

*Primary Examiner* — Phong La
(74) *Attorney, Agent, or Firm* — Slater Matsil, LLP

(57) ABSTRACT

This application discloses a frequency compensation method and apparatus, to improve performance of frequency compensation. The method includes: determining a change rate of a Doppler frequency shift value based on a weighted change rate of a change rate of a timing advance TA, determining the Doppler frequency shift value based on the change rate of the Doppler frequency shift value, and performing frequency compensation based on the determined Doppler frequency shift value; or determining a frequency offset value based on the Doppler frequency shift value with reference to pre-compensation and based on a reference signal, to further determine a frequency offset value, and performing frequency compensation based on the frequency offset value.

13 Claims, 10 Drawing Sheets

(58) Field of Classification Search
CPC ........... H04W 56/0035; H04W 56/004; H04W 56/0045; H04W 56/005
See application file for complete search history.

(56) References Cited

U.S. PATENT DOCUMENTS

2018/0241464 A1    8/2018  Michaels
2019/0280911 A1    9/2019  Jung et al.

FOREIGN PATENT DOCUMENTS

| | | | |
|---|---|---|---|
| CN | 104426821 A | 3/2015 | |
| CN | 107396454 A | 11/2017 | |
| CN | 108040366 A * | 5/2018 | |
| EP | 2568533 A1 | 3/2013 | |
| EP | 3447936 A1 * | 2/2019 | ......... H04B 7/18508 |

OTHER PUBLICATIONS

OPPO, "NTN operation for Doppler and Timing Advance, Random Access and UE Location in NTN", 3GPP TSG RAN WG1 #98bis, R1-1910387, Chongqing, China, Oct. 14-20, 2019, 4 pages.
Rongfang, L., "Study of the Applicability of GSM-R System to High Speed", Railway Signalling & Communication, vol. 46, No. 7, Jul. 2010, 4 pages.

* cited by examiner

FREQUENCY COMPENSATION METHOD AND APPARATUS

CROSS-REFERENCE TO RELATED APPLICATIONS

This application is a continuation of International Application No. PCT/CN2021/071534, filed on Jan. 13, 2021, which claims priority to Chinese Patent Application No. 202010082650.0, filed on Feb. 7, 2020. The disclosures of the aforementioned applications are hereby incorporated by reference in their entireties.

TECHNICAL FIELD

Embodiments of this application relate to the field of communications technologies, and in particular, to a frequency compensation method and apparatus.

BACKGROUND

To improve communication quality, a terminal performs frequency synchronization and frequency tracking with a satellite. In the conventional technology, a terminal usually tracks a downlink frequency based on a received downlink reference signal, and performs frequency compensation based on a frequency offset value. In a high-speed moving scenario, a main component of a frequency offset is a Doppler frequency shift. After the frequency tracking method and the frequency compensation method in the conventional technology are used, a residual frequency offset exists. The residual frequency offset increases inter-subcarrier interference and degrades receiving performance of a receive end.

For example, in a satellite mobile communications system, in addition to a geosynchronous orbit satellite system, satellites in another type of satellite system all have a specific moving speed relative to the ground, and a lower orbital altitude indicates a higher relative speed. A relatively large moving speed between a satellite and a terminal causes a relatively large Doppler frequency shift to be generated. This greatly increases complexity of performing frequency offset tracking by the terminal, and affects an effect of performing frequency compensation by the terminal.

SUMMARY

Embodiments of this application provide a frequency compensation method and apparatus, to improve performance of frequency compensation.

Specific technical solutions provided in embodiments of this application are as follows.

According to a first aspect, a frequency compensation method is provided. The method may be performed by a terminal device or a chip, a chip system, or a circuit located in the terminal device, and the method is implemented by using the following steps: determining a Doppler frequency shift value $F_d$ based on a weighted change rate of a change rate of a timing advance TA; and performing frequency compensation based on the Doppler frequency shift value $F_d$. The Doppler frequency shift value determined based on the weighted change rate of the change rate of the timing advance TA is more accurate, so that frequency synchronization or frequency compensation precision can be improved without increasing complexity of the terminal. In addition, a frequency offset value indicated by a network device to the terminal device in a closed-loop manner may be reduced, and signaling overheads are reduced.

In a possible design, the Doppler frequency shift value $F_d$ is determined by using a formula: $F_d=Kd*\Delta t$, where Kd represents a change rate of the Doppler frequency shift value; and the change rate Kd of the Doppler frequency shift value and the TA meet the following formula or an equivalent expression form of the following formula: $Kd=\alpha*(TA(t+2\Delta t)-TA(t+\Delta t))-\beta(TA(t+\Delta t)-TA(t))$, where t represents a time, $\Delta t$ represents a unit time, and $\alpha$ and $\beta$ represent weighting coefficients. The change rate of the Doppler frequency shift value may be determined based on the weighted change rate of the change rate of the TA, and the Doppler frequency shift value is further determined based on the change rate of the Doppler frequency shift value.

When $\beta=1$, $Kd=\alpha*(TA(t+2\Delta t)-TA(t+\Delta t))-(TA(t+\Delta t)-TA(t))$.

In a possible design, frequency compensation is performed on a downlink signal according to F=F0-F1, where F represents a compensated frequency, F0 represents a frequency before compensation, F1 represents a frequency offset value, and F1 and $F_d$ meet any one of the following formulas or an equivalent expression form of any one of the following formulas: $F1=F_d$, $F1=F_{offset}+F_d$, or $F1=F_{offset}+F_d+F2$, where $F_{offset}$ represents a common component of a Doppler frequency shift value of a terminal in a cell, and F2 represents a frequency offset value determined based on a downlink reference signal. When $F1=F_d$, frequency compensation is performed only by using $F_d$, to reduce the frequency offset value determined by the terminal based on the downlink reference signal, and reduce the complexity of the terminal, and $F_d$ is determined based on the weighted change rate of the change rate of the TA, so that precision of determining the frequency offset value is relatively high, and an effect of frequency compensation is improved. When $F1=F_{offset}+F_d$, the downlink signal may be post-compensated on a terminal side based on the common component. Using a post-compensation solution does not affect the change rate of the Doppler frequency shift value, and does not affect implementability of the solution for determining the change rate of the Doppler frequency shift value based on the weighted change rate of the change rate of the TA. The frequency offset value is determined through post-compensation and $F_d$, so that precision of frequency compensation can be improved. When $F1=F_{offset}+F_d+F2$, a residual frequency offset value can be compensated for with reference to the downlink reference signal, thereby further improving the precision of frequency compensation.

In a possible design, frequency compensation is performed on a to-be-sent uplink signal according to F=F0-F1, where F represents a compensated frequency, F0 represents a frequency before compensation, F1 represents a frequency offset value, and F1 and $F_d$ meet any one of the following formulas or an equivalent expression form of any one of the following formulas: $F1=-F_{DL}+2F_d$, $F1=F_{offset}+(-F_{DL}+2F_d)$, or $F1=F_{offset}+(-F_{DL}+2F_d)+F3$, where $F_{DL}$ represents a frequency offset value determined based on a downlink received signal, $F_{DL}$ represents a positive value, $F_{offset}$ represents a common component of a Doppler frequency shift value of a terminal in a cell, and F3 represents a frequency offset value that is determined by a network device based on an uplink reference signal and that is indicated by the network device. When $F1=-F_{DL}+2F_d$, before an uplink signal is sent, it is considered that the to-be-sent uplink signal is pre-compensated in advance by using an offset value that is twice the frequency offset of the crystal oscillator, to avoid generating the offset value that is twice the frequency offset of the crystal oscillator at a receive end. When $F1=F_{offset}+(-F_{DL}+2F_d)$, the terminal device further determines a frequency offset value with reference to the common component of the Doppler frequency shift value of the terminal in the cell, so that frequency compensation accuracy can be further improved. When $F1=F_{offset}+(-F_{DL}+2F_d)+F3$, the terminal device further determines a final frequency offset value with reference to the common component of the Doppler frequency shift value of the terminal in the cell and a frequency offset value indicated by a satellite in a closed-loop manner, so that frequency compensation accuracy can be further improved.

In a possible design, the performing frequency compensation based on the Doppler frequency shift value $F_d$ includes: adjusting a frequency of a crystal oscillator based on F1, and sending an uplink signal based on the adjusted frequency of the crystal oscillator, where F1 and $F_d$ meet any one of the following formulas or an equivalent expression form of any one of the following formulas: $F1=2F_d$, $F1=F_{offset}+2F_d$, $F1=2F_d+F3$, or $F1=F_{offset}+2F_d+F3$, where $F_{offset}$ represents a common component of a Doppler frequency shift value of a terminal in a cell, and F3 represents a frequency offset value that is determined by a network device based on an uplink reference signal and that is indicated by the network device. When $F1=2F_d$, a transmit end (namely, the terminal device) adjusts the frequency of the crystal oscillator based on $2F_d$, to avoid generating twice the Doppler frequency shift value at the receive end, so that an offset value of a signal received at the receive end is reduced, even to zero or near zero. When $F1=F_{offset}+2F_d$, the terminal device adjusts the frequency of the crystal oscillator by using $2F_d$ with reference to the common component of the Doppler frequency shift value of the terminal in the cell, so that frequency compensation accuracy can be further improved. When $F1=F_{offset}+2F_d+F3$, the terminal device further adjusts the frequency of the crystal oscillator by using $2F_d$ with reference to the common component of the Doppler frequency shift value of the terminal in the cell and a frequency offset value indicated by a satellite in a closed-loop manner, so that frequency compensation accuracy can be further improved.

In a possible design, F3 is further received from the network device.

According to a second aspect, a frequency compensation apparatus is provided, and the apparatus has a function of implementing the method in any one of the first aspect or the possible designs of the first aspect. The function may be implemented by hardware, or may be implemented by hardware executing corresponding software. The hardware or the software includes one or more modules corresponding to the foregoing function. In a design, the apparatus may include a determining unit and a compensation unit. For example, the determining unit is configured to determine a Doppler frequency shift value $F_d$ based on a weighted change rate of a change rate of a timing advance TA; and the compensation unit is configured to perform frequency compensation based on the Doppler frequency shift value $F_d$ determined by the determining unit.

In a possible design, the Doppler frequency shift value $F_d$ is determined by using a formula: $F_d=Kd*\Delta t$, where Kd represents a change rate of the Doppler frequency shift value; and the change rate Kd of the Doppler frequency shift value and the TA meet the following formula or an equivalent expression form of the following formula: $Kd=\alpha*(TA(t+2\Delta t)-TA(t+\Delta t))-\beta(TA(t+\Delta t)-TA(t))$, where t represents a time, $\Delta t$ represents a unit time, and $\alpha$ and $\beta$ represent weighting coefficients.

In a possible design, when performing frequency compensation based on the Doppler frequency shift value $F_d$, the compensation unit is configured to perform frequency compensation on a downlink signal according to $F=F0-F1$, where F represents a compensated frequency, F0 represents a frequency before compensation, F1 represents a frequency offset value, and F1 and $F_d$ meet any one of the following formulas or an equivalent expression form of any one of the following formulas: $F1=F_d$, $F1=F_{offset}+F_d$, or $F1=F_{offset}+F_d+F2$, where $F_{offset}$ represents a common component of a Doppler frequency shift value of a terminal in a cell, and F2 represents a frequency offset value determined based on a downlink reference signal.

In a possible design, when performing frequency compensation based on the Doppler frequency shift value $F_d$, the compensation unit is configured to perform frequency compensation on a to-be-sent uplink signal according to $F=F0-F1$, where F represents a compensated frequency, F0 represents a frequency before compensation, F1 represents a frequency offset value, and F1 and $F_d$ meet any one of the following formulas or an equivalent expression form of any one of the following formulas: $F1=-F_{DL}+2F_d$, $F1=F_{offset}+(-F_{DL}+2F_d)$, or $F1=F_{offset}+(-F_{DL}+2F_d)+F3$, where $F_{DL}$ represents a frequency offset value determined based on a downlink received signal, $F_{offset}$ represents a common component of a Doppler frequency shift value of a terminal in a cell, and F3 represents a frequency offset value that is determined by a network device based on an uplink reference signal and that is indicated by the network device.

In a possible design, when performing frequency compensation based on the Doppler frequency shift value $F_d$, the compensation unit is configured to adjust a frequency of a crystal oscillator based on F1; and the apparatus further includes a sending unit, configured to send an uplink signal based on the frequency of the crystal oscillator adjusted by the compensation unit, where F1 and $F_d$ meet any one of the following formulas or an equivalent expression form of any one of the following formulas: $F1=2F_d$, $F1=F_{offset}+2F_d$, or $F1=F_{offset}+2F_d+F3$, where $F_{offset}$ represents a common component of a Doppler frequency shift value of a terminal in a cell, and F3 represents a frequency offset value that is determined by a network device based on an uplink reference signal and that is indicated by the network device.

For beneficial effects of the second aspect and the designs, refer to beneficial effects corresponding to the first aspect and the designs.

According to a third aspect, an embodiment of this application provides a frequency compensation apparatus. The frequency compensation apparatus includes a communications interface and a processor, and the communications interface is configured to communicate with another device, for example, receive and send data or a signal. For example, the communications interface may be a transceiver, a circuit, a bus, a module, or another type of communications interface, and the another device may be a network device or a node. The processor is configured to invoke a group of programs, instructions, or data to perform the method according to the first aspect or the possible designs. The apparatus may further include a memory, configured to store the programs, the instructions, or the data invoked by the processor. The memory is coupled to the processor, and when executing the instructions or the data stored in the memory, the processor may implement the method according to the first aspect or the possible designs.

According to a fourth aspect, an embodiment of this application further provides a computer-readable storage medium. The computer-readable storage medium stores computer-readable instructions, and when the computer-readable instructions are run on a computer, the computer is enabled to perform the method according to any one of the first aspect or the possible designs of the first aspect.

According to a fifth aspect, an embodiment of this application provides a chip system. The chip system includes a processor, and may further include a memory, configured to implement the method according to any one of the first aspect or the possible designs of the first aspect. The chip system may include a chip, or may include a chip and another discrete device.

According to a sixth aspect, an embodiment of this application provides a communications system. The system includes a terminal device and a network device, and the terminal device is configured to perform the method according to any one of the first aspect or the possible designs of the first aspect.

According to a seventh aspect, a computer program product that includes instructions is provided. When the computer program product is run on a computer, the computer is enabled to perform the method according to any one of the first aspect and the possible designs of the first aspect.

DETAILED DESCRIPTION OF ILLUSTRATIVE EMBODIMENTS

Embodiments of this application provide a frequency compensation method and apparatus. The method and the apparatus are based on a same technical concept. Because problem resolving principles of the method and the apparatus are similar, mutual reference may be made to implementation of the apparatus and the method, and no repeated description is provided. In descriptions of embodiments of this application, the term "and/or" describes an association relationship between associated objects and indicates that three relationships may exist. For example, A and/or B may indicate the following three cases: Only A exists, both A and B exist, and only B exists. The character "/" generally represents an "or" relationship between the associated objects. In this application, "at least one" means one or more, and "a plurality of" means two or more. In addition, it should be understood that, in the descriptions of this application, the terms such as "first", "second", and "third" are merely used for differentiation and description, but cannot be understood as an indication or implication of relative importance or an indication or implication of an order.

The frequency compensation method provided in embodiments of this application may be applied to a 4th generation (4G) communications system, for example, a long term evolution (LTE) system, or may be applied to a 5th generation (5G) communications system, such as 5G new radio (NR), or may be applied to various communications systems in the future, such as a 6th generation (6G) communications system. The method provided in embodiments of this application may be applied to a terrestrial network communications system, or may be applied to a non-terrestrial network (NTN) communications system.

Figure 1:
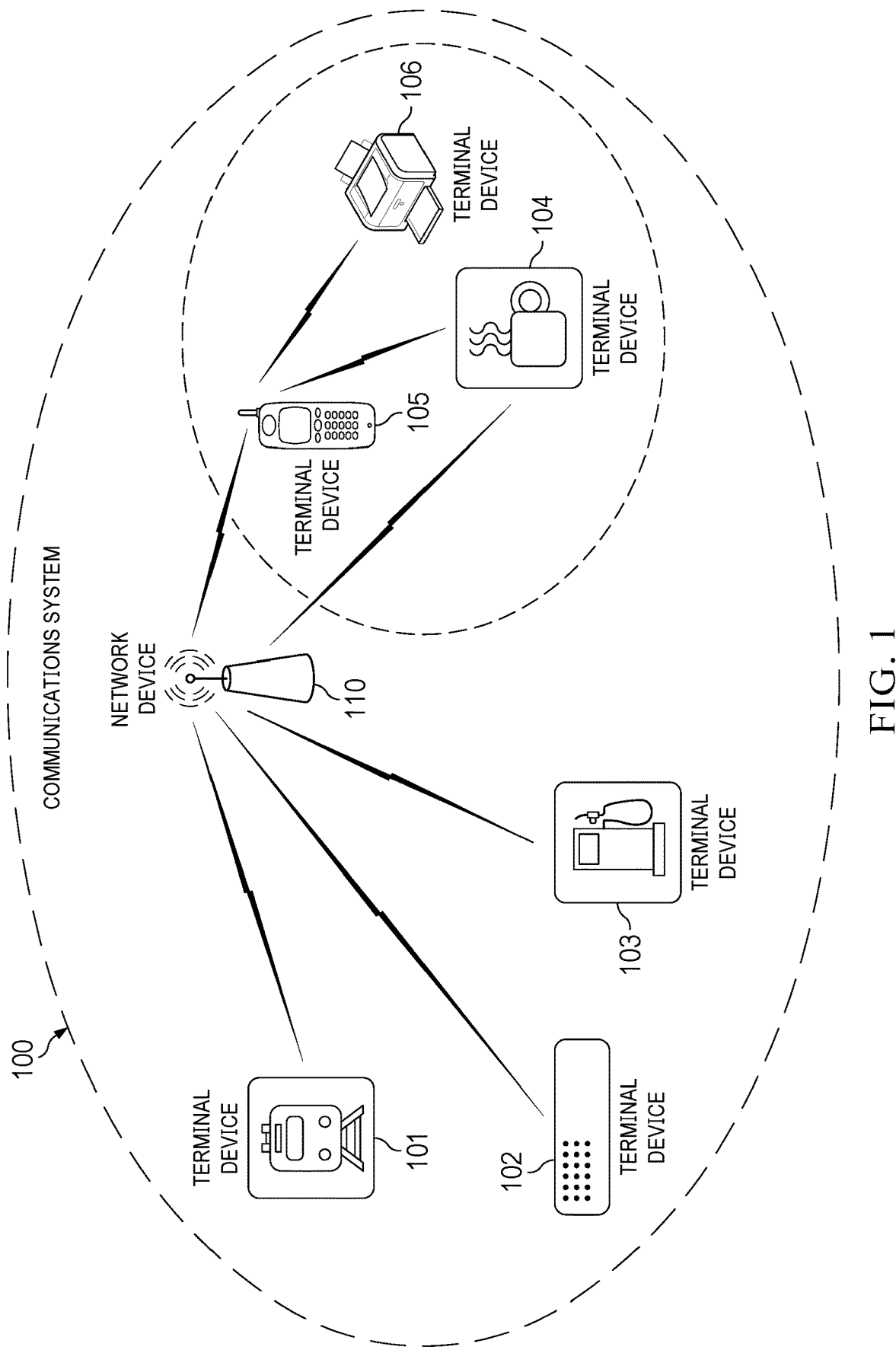
FIG. 1 is a schematic diagram of an architecture of a terrestrial network communications system according to an embodiment of this application.

FIG. 1 shows an architecture of a possible terrestrial network communications system to which a frequency compensation method according to an embodiment of this application is applicable. The communications system 100 may include a network device 110 and terminal devices 101 to 106. It should be understood that the communications system 100 may include more or fewer network devices or terminal devices. The network device or the terminal device may be hardware, may be software obtained through functional division, or may be a combination thereof. In addition, the terminal devices 104 to 106 may also form a communications system. For example, the terminal device 105 may send downlink data to the terminal device 104 or the terminal device 106. The network device or the terminal device may communicate with each other by using another device or network element. The network device 110 may send downlink data to the terminal devices 101 to 106, or may receive uplink data sent by the terminal devices 101 to 106. Certainly, the terminal devices 101 to 106 may also send uplink data to the network device 110, or may receive downlink data sent by the network device 110.

The network device 110 is a node in a radio access network (RAN), and may also be referred to as a base station or a RAN node (or a device). Currently, for example, some access network devices 101 are a gNB/NR-NB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), or a network device in a 5G communications system or a network device in a future possible communications system. The network device 110 may be alternatively another device that has a network device function. For example, the network device 110 may be alternatively a device that functions as a network device in D2D communication. The network device 110 may be alternatively a network device in a future possible communications system.

The terminal devices 101 to 106 each may also be referred to as user equipment (UE), a mobile station (MS), a mobile terminal (MT), or the like, and is a device that provides a user with voice or data connectivity, or may be an internet of things device. For example, the terminal devices 101 to 106 include a handheld device, a vehicle-mounted device, and the like that have a wireless connection function. Currently, the terminal devices 101 to 106 each may be a mobile phone, a tablet computer, a notebook computer, a palmtop computer, a mobile internet device (MID), a wearable device (for example, a smartwatch, a smart band, or a pedometer), a vehicle-mounted device (for example, an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an unmanned aerial vehicle, or an aircraft), or the like. The terminal devices 101 to 106 may be alternatively other devices that have a terminal function. For example, the terminal devices 101 to 106 may be alternatively devices that function as terminals in D2D communication.

Figure 2:
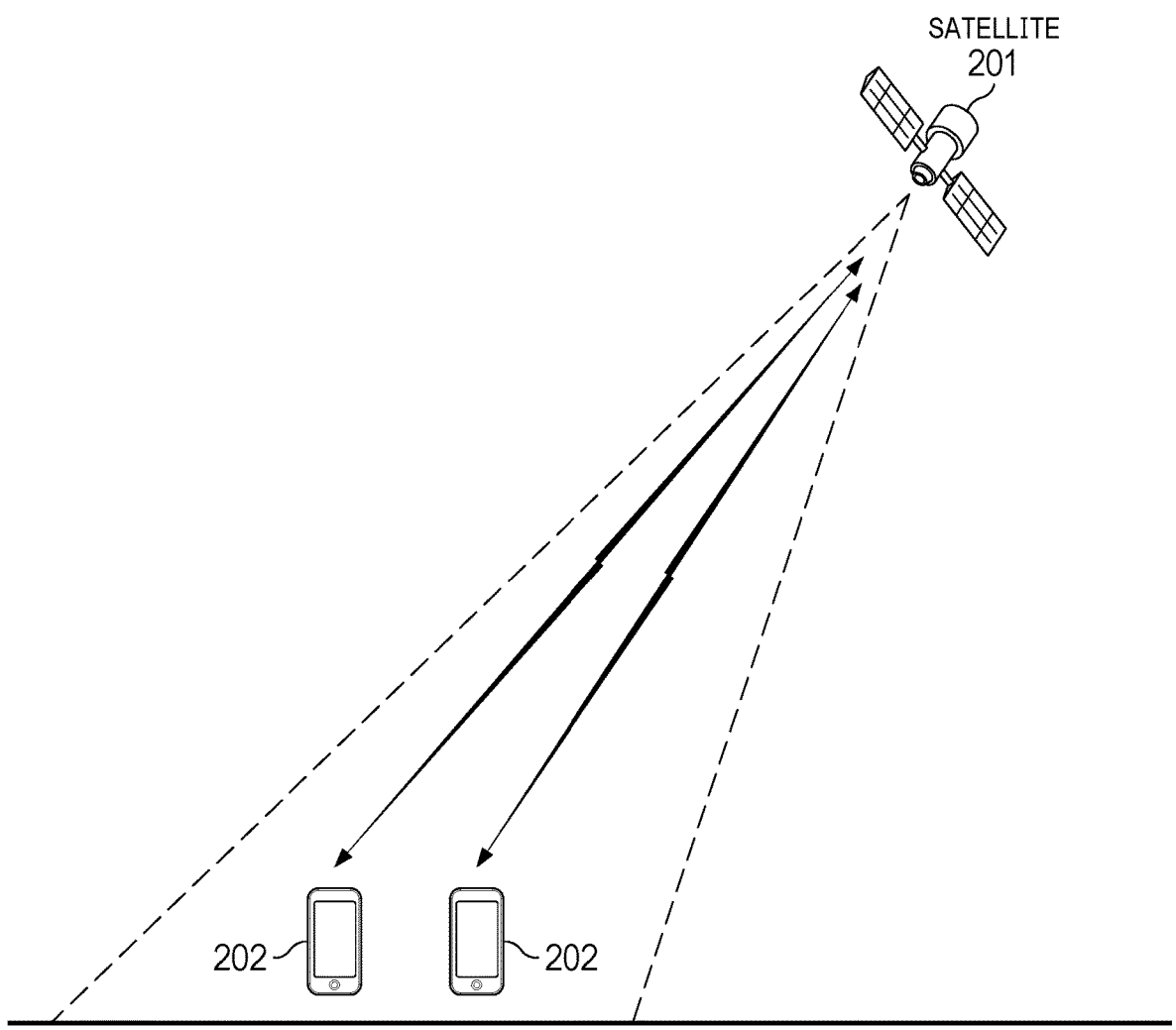
FIG. 2 is a schematic diagram of an architecture of a non-terrestrial network communications system according to an embodiment of this application.

Based on description of the architecture of the terrestrial network communications system shown in FIG. 1, the frequency compensation method provided in this embodiment of this application is applicable to an NTN communications system. As shown in FIG. 2, the NTN communications system includes a satellite 201 and terminal devices 202. For explanation of the terminal device 202, refer to the related descriptions of the terminal devices 101 to 106. The satellite 201 may also be referred to as a high-altitude platform, a high-altitude aircraft, or a satellite base station. When the NTN communications system is associated with the terrestrial network communications system, the satellite 201 may be considered as one or more network devices in the architecture of the terrestrial network communications system. The satellite 201 provides a communication service to the terminal device 202, and the satellite 201 may be further connected to a core network device. For a structure and a function of the network device 201, refer to the foregoing descriptions of the network device 201. For a communication manner between the satellite 201 and the terminal device 202, refer to the descriptions in FIG. 1. Details are not described herein again.

Figure 3:
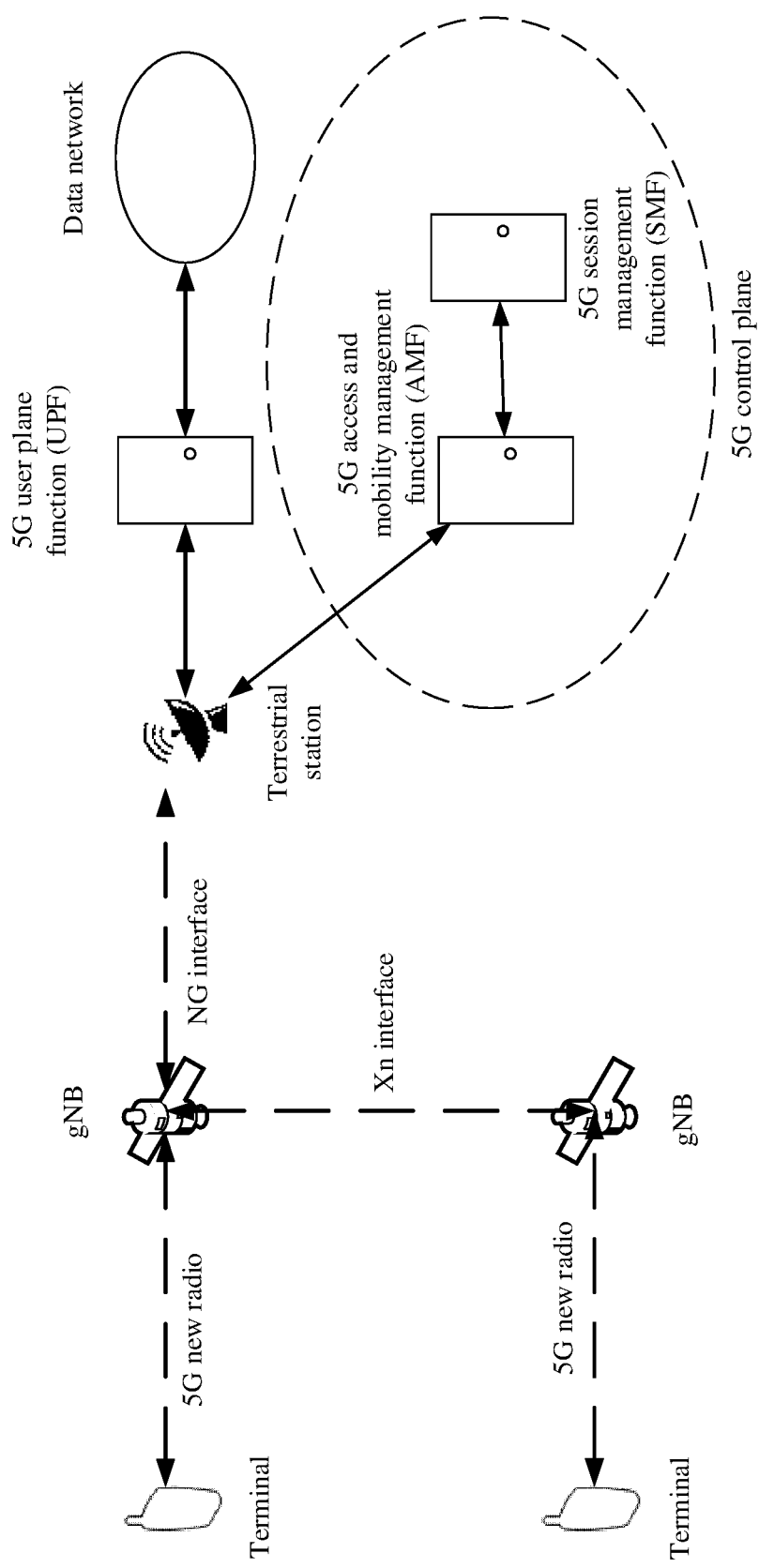
FIG. 3 is a schematic diagram of an architecture of a 5G satellite communications system according to an embodiment of this application.

5G is used as an example. An architecture of a 5G satellite communications system is shown in FIG. 3. A terrestrial terminal device accesses a network through 5G new radio. A gNB is deployed on a satellite, and is connected to a terrestrial core network through a radio link. In addition, there are radio links between satellites to implement signaling exchange and user data transmission between base stations. Devices and interfaces in FIG. 3 are described as follows:

A 5G core network provides services such as user access control, mobility management, session management, user security authentication, and accounting. The 5G core network includes a plurality of functional units, which can be classified into control-plane functional entities and data-plane functional entities. An access and mobility management unit (AMF) is responsible for user access management, security authentication, and mobility management. A user plane unit (UPF) manages user-plane data transmission, traffic statistics collection, and lawful interception.

A terrestrial station is responsible for forwarding signaling and service data between a satellite base station and a 5G core network.

5G new radio: a radio link between a terminal and a base station.

Xn interface: an interface between gNBs and mainly used for signaling interaction, for example, handover.

An NG interface is an interface between a gNB and a 5G core network, and is mainly used for exchange of NAS signaling of the core network and user service data.

The network device in the terrestrial network communications system and the satellite in the NTN communications system are all regarded as network devices. An apparatus configured to implement a function of the network device may be a network device or may be an apparatus that can support the network device in implementing the function, for example, a chip system. The apparatus may be installed in the network device. When the technical solutions provided in embodiments of this application are described below, an example in which an apparatus configured to implement a function of a network device is a satellite is used to describe the technical solutions provided in embodiments of this application. It may be understood that, when the method provided in embodiments of this application is applied to the terrestrial network communications system, an action performed by the satellite may be performed by a base station or a network device.

In embodiments of this application, an apparatus configured to implement a function of a terminal device may be a terminal device, or may be an apparatus, for example, a chip system, that can support the terminal device in implementing the function. The apparatus may be mounted in the terminal device. In embodiments of this application, the chip system may include a chip, or may include a chip and another discrete component. In the technical solutions provided in embodiments of this application, an example in which the apparatus configured to implement a function of a terminal device is a terminal or UE is used to describe the technical solutions provided in embodiments of this application.

The following describes in detail embodiments of this application with reference to accompanying drawings.

Figure 4:
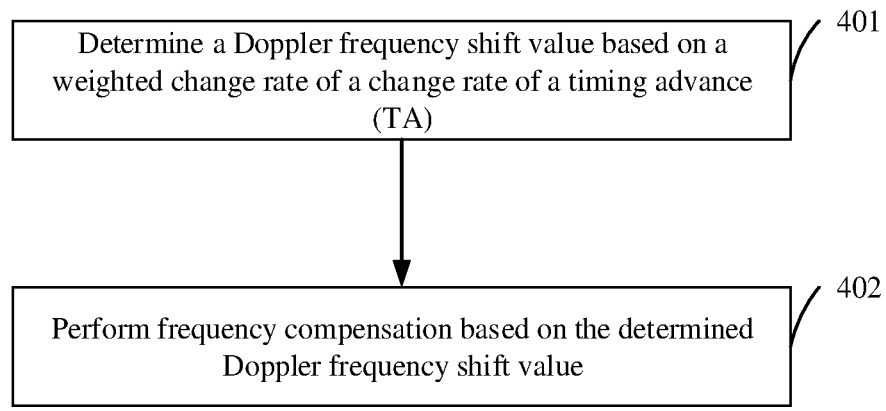
FIG. 4 is a schematic flowchart of a frequency compensation method according to an embodiment of this application.

As shown in FIG. 4, a procedure of a frequency compensation method in an embodiment of this application is described as follows: The method may be performed by a terminal device.

Step 401: Determine a Doppler frequency shift value based on a weighted change rate of a change rate of a timing advance (TA).

Step 402: Perform frequency compensation based on the determined Doppler frequency shift value.

The following describes in detail some optional implementations and optional design details of the embodiment shown in FIG. 4.

Figure 5A:
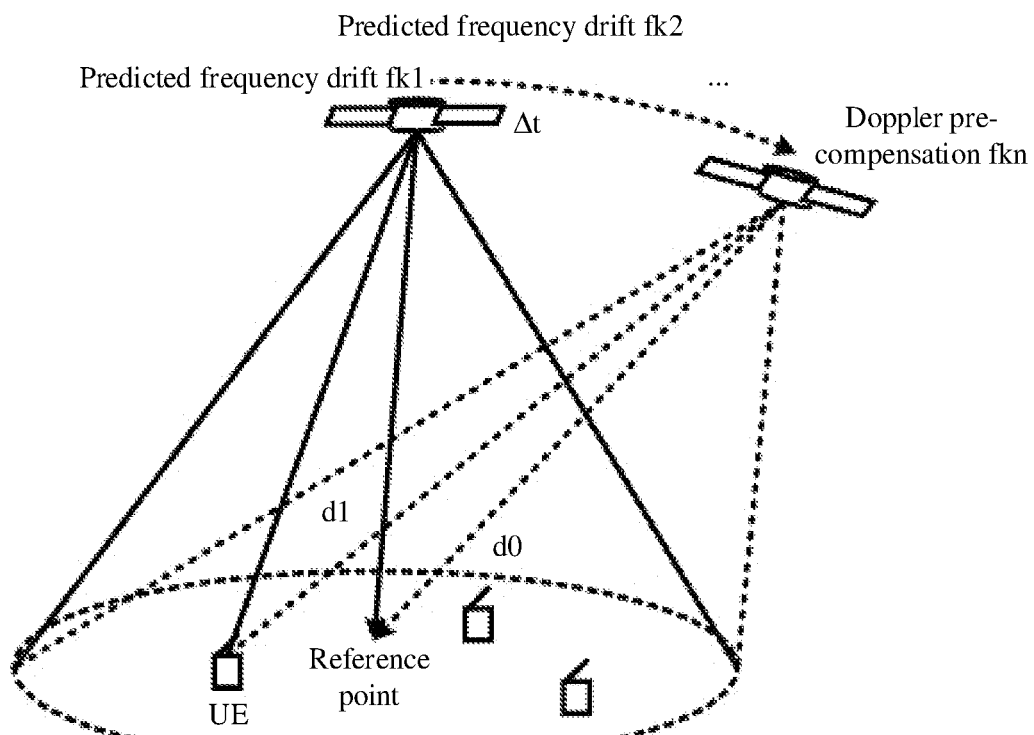
FIG. 5a is a schematic diagram of a Doppler change rate changing with an elevation angle according to an embodiment of this application.
Figure 5B:
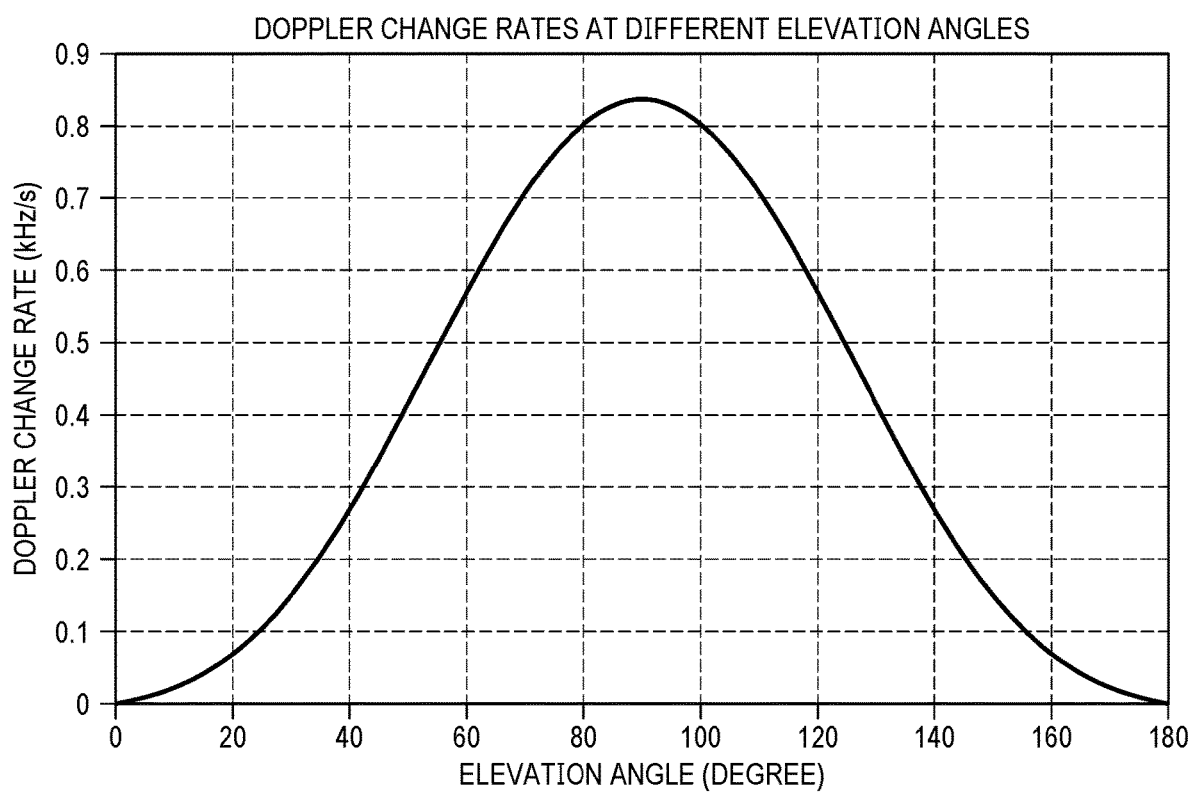
FIG. 5b is a schematic diagram of a curve of a Doppler change rate changing with an elevation angle according to an embodiment of this application.

In a satellite communications system, for a cell covered by a satellite, the Doppler frequency shift value changes with time regardless of overhead duration of a satellite. As shown in FIG. 5*a*, a change rate of the Doppler frequency shift value changing with time is related to an angle between the satellite and the cell. An angle between the satellite and the cell may be referred to as an elevation angle. FIG. 5*b* shows a curve of a Doppler change rate changing with an elevation angle, and this is only an example.

Figure 6:
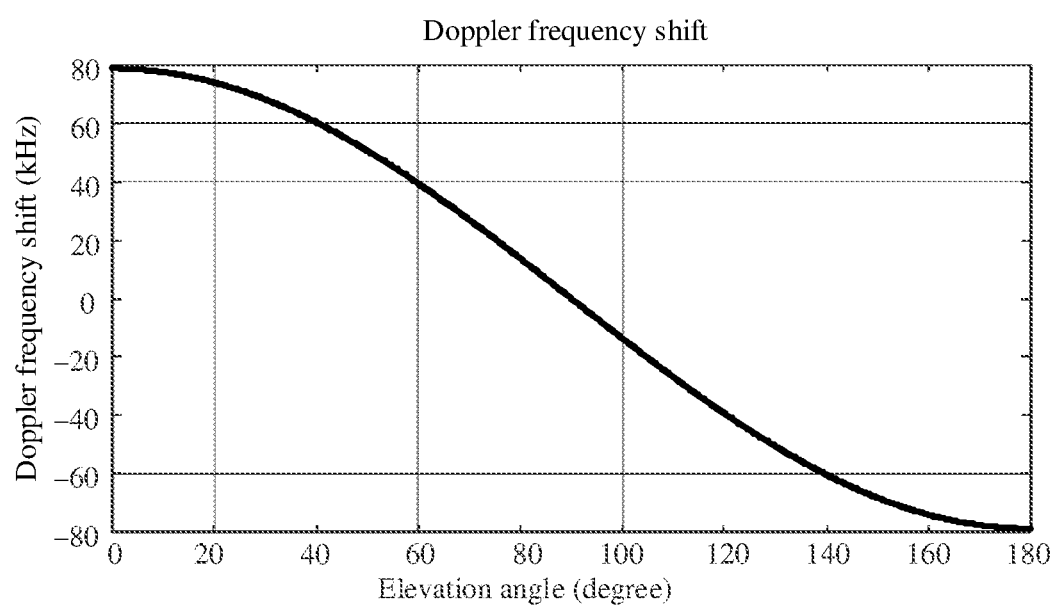
FIG. 6 is a schematic diagram of a Doppler frequency shift value changing with an elevation angle in a satellite scenario according to an embodiment of this application.

The satellite and the terminal move with respect to each other at a relatively high speed. Compared with a terrestrial cellular network, a quite large Doppler frequency shift is generated. FIG. 6 shows Doppler frequency shift values at different elevation angles. In a case of a satellite altitude of 600 km, a beam diameter of 200 km, and a center frequency of 3.5 GHz, a maximum Doppler frequency shift value is approximately +/−80 kHz, and seriously affects downlink synchronization and frequency offset estimation performance.

In this embodiment of this application, the Doppler frequency shift value is determined based on the TA. Specifically, the Doppler frequency shift value is related to the weighted change rate of the change rate of the TA.

The satellite altitude of 600 km, the beam diameter of 200 km, and the center frequency of 3.5 GHz are used as an example. FIG. 5a is a simulation image of the weighted change rate of the change rate of the TA, and FIG. 5b is a simulation image of the change rate of the Doppler frequency shift value. According to the simulation images in FIG. 5a and FIG. 5b, it can be learned that the change rate of the Doppler frequency shift value is related to the weighted change rate of the change rate of the TA.

In this embodiment of this application, the change rate of the Doppler frequency shift value may be determined based on the weighted change rate of the change rate of the TA, and the Doppler frequency shift value is determined based on the change rate of the Doppler frequency shift value.

If represented by a formula, a relationship between the Doppler frequency shift value and the TA may be represented by but is not limited to the following formula.

The Doppler frequency shift value may be determined by using Formula (1):

$$F_d = Kd * \Delta t \quad \text{Formula (1)}$$

$F_d$ represents the Doppler frequency shift value, Kd represents the change rate of the Doppler frequency shift value, or Kd represents the weighted change rate of the change rate of the TA. $\Delta t$ represents a unit time.

The change rate Kd of the Doppler frequency shift value and the TA meet Formula (2) or an equivalent expression form of Formula (2) in the following.

$$Kd = \alpha*(TA(t+2\Delta t) - TA(t+\Delta t)) - \beta(TA(t+\Delta t) - TA(t)) \quad \text{Formula (2)}$$

In Formula (2), $\alpha$ and $\beta$ represent weighting coefficients. One of $\alpha$ and $\beta$ is not zero; or neither $\alpha$ nor $\beta$ is zero; or both $\alpha$ and $\beta$ are positive; or both $\alpha$ and $\beta$ are negative; and t represents a time.

If $\beta=1$, Formula (2) may be transformed to Formula (3-1).

$$Kd = \alpha*(TA(t+2\Delta t) - TA(t+\Delta t)) - (TA(t+\Delta t) - TA(t)) \quad \text{Formula (3-1)}$$

If $\beta=\alpha$, Formula (2) may be transformed to Formula (3-2).

$$Kd = \alpha*(TA(t+2\Delta t) - TA(t+\Delta t) - (TA(t+\Delta t) - TA(t))) \quad \text{Formula (3-2)}$$

In this embodiment of this application, a possible implementation of determining the Doppler frequency shift value based on the TA may be implemented according to Formula (1) and Formula (2). It may be understood that Formula (1) and Formula (2) may be alternatively combined into one formula: $F_d = (\alpha*(TA(t+2\Delta t) - TA(t+\Delta t)) - \beta(TA(t+\Delta t) - TA(t)))*\Delta t$. The Doppler frequency shift value may be determined according to the combined formula. Similarly, Formula (1) and Formula (3-1) may also be combined into one formula, and Formula (1) and Formula (3-2) may also be combined into one formula. Certainly, Formula (1) and an equivalent expression form of Formula (2) may also be combined into one formula. For example, $F_d = (\alpha*(TA(t+2\Delta t) - TA(t+\Delta t)) - (TA(t+\Delta t) - TA(t)))*\Delta t$. Alternatively, the combined formula may be replaced with an equivalent expression form for determining the Doppler frequency shift value based on the TA.

After determining the Doppler frequency shift value, the terminal device may perform frequency compensation based on the Doppler frequency shift value, or may perform frequency compensation based on the Doppler frequency shift value with reference to a pre-compensated offset value, an offset value determined based on a downlink reference signal, or an offset value indicated by the network device. The frequency compensation may include performing frequency offset correction on a downlink signal, or may include performing frequency pre-compensation on a to-be-sent uplink signal, or may include adjusting a frequency of a crystal oscillator. The following describes a possible implementation of the frequency compensation.

The terminal device may perform frequency compensation on the downlink signal by using the frequency offset value. The frequency offset value may be the Doppler frequency shift value, or may be a combination of the Doppler frequency shift value and another offset value.

Frequency compensation may be performed on the downlink signal according to Formula (4).

$$F = F0 - F1 \quad \text{Formula (4)}$$

In Formula (4), F represents a compensated frequency, F0 represents a frequency before compensation, and F1 represents a frequency offset value.

For example, a frequency of a downlink signal received by the terminal device is 10 Hz, a frequency offset value is 2 Hz, and a compensated frequency is (10−2)=8 Hz.

In one case, the frequency offset value may be the Doppler frequency shift value, in other words, $F1=F_d$, or $F1=(\alpha*(TA(t+2\Delta t) - TA(t+\Delta t)) - \beta(TA(t+\Delta t) - TA(t)))*\Delta t$, or $F1=(\alpha*(TA(t+2\Delta t) - TA(t+\Delta t)) - (TA(t+\Delta t) - TA(t)))*\Delta t$.

In another case, the frequency offset value may be a Doppler frequency shift value combined with a pre-compensated frequency offset value, in other words, $F1=F_{offset}+F_d$, where $F_{offset}$ represents the pre-compensated frequency offset value. In actual application, because a common component exists in a Doppler frequency shift value caused by movement of a satellite to a terminal in a cell, a residual Doppler frequency shift may be usually reduced in a manner of performing frequency pre-compensation at a transmit end or performing frequency post-compensation at a receive end. For example, if a minimum Doppler frequency shift value brought by the movement of the satellite to the terminal in the cell is 10 Hz, and a maximum Doppler frequency shift value is 100 Hz, the common component of the Doppler frequency shift value of the terminal in the cell is 10 Hz. In other words, $F_{offset}$ is 10 Hz.

In still another case, $F1=F_{offset}+F_d+F2$, or $F1=F_{offset}+(\alpha*(TA(t+2\Delta t) - TA(t+\Delta t)) - \beta(TA(t+\Delta t) - TA(t)))*\Delta t+F2$, or $F1=F_{offset}+(\alpha*(TA(t+2\Delta t) - TA(t+t)) - (TA(t+\Delta t) - TA(t)))*\Delta t+F2$. F2 represents a frequency offset value determined based on the downlink reference signal. In actual application, the terminal device may receive the downlink reference signal from the satellite, and determine the frequency offset value based on the downlink reference signal. In this case, after determining the Doppler frequency shift based on the weighted change rate of the change rate of the TA, the terminal device performs frequency compensation with reference to the common component of the Doppler frequency shift value of the terminal in the cell and the frequency offset value determined based on the downlink reference signal, so that frequency compensation accuracy can be further improved.

In yet another case, the frequency offset value may be determined with reference to the Doppler frequency shift value and the offset value determined based on the downlink reference signal, in other words, $F1=F_d+F2$, or $F1=(\alpha*(TA(t+2\Delta t)-TA(t+\Delta t))-\beta(TA(t+\Delta t)-TA(t)))*\Delta t+F2$, or $F1=(\alpha*(TA(t+2\Delta t)-TA(t+\Delta t))-(TA(t+\Delta t)-TA(t)))*\Delta t+F2$.

The terminal adjusts, based on the determined frequency offset value, a downlink center frequency to be consistent with a frequency of the downlink signal, in other words, downlink frequencies are synchronized, and then the terminal sends an uplink signal. The Doppler frequency shift value determined by using the weighted change rate of the change rate of the TA can make the finally determined frequency offset value more accurate and downlink frequency synchronization more accurate.

The terminal device may adjust the frequency of the crystal oscillator by using the frequency offset value F1. The frequency offset value may be the Doppler frequency shift value, or may be a combination of the Doppler frequency shift value and another offset value.

Usually, in a downlink frequency synchronization process, the terminal device determines a frequency offset based on the downlink reference signal. The terminal device determines, based on a downlink signal, that a frequency offset value includes a Doppler frequency shift and a frequency offset caused by the crystal oscillator. After the downlink frequency synchronization, the terminal device sends an uplink signal, and an offset value that is approximately twice the residual Doppler frequency shift is generated at a receive end. For example, it is assumed that the central frequency is Fc=3.5 GHz, the frequency offset of the crystal oscillator Fosc=0.2, the Doppler frequency shift value $F_d=0.8$, the signal received by the terminal device is 3.5+0.6=4.1, and a deviation of 0.6 is detected. If the terminal device adjusts a crystal oscillator of the terminal device, an adjustment amount is 0.6, and a frequency for sending an uplink signal is 3.7+0.6=4.3. A frequency of a signal received at the receive end is 4.3+0.8=5.1, is 1.6 different from the central frequency of 3.5, and is approximately twice the Doppler frequency shift value. In this embodiment of this application, the frequency of the crystal oscillator may be adjusted with reference to twice the Doppler frequency shift value, to avoid generating approximately twice the Doppler frequency shift value of the signal received at the receive end.

In one case, the frequency offset value F1 may be twice the Doppler frequency shift value, in other words, $F1=2F_d$, or $F1=2(\alpha*(TA(t+2\Delta t)-TA(t+\Delta t))-\beta(TA(t+\Delta t)-TA(t)))*\Delta t$, or $F1=2(\alpha*(TA(t+2\Delta t)-TA(t+\Delta t))-(TA(t+\Delta t)-TA(t)))*\Delta t$. A transmit end (namely, the terminal device) adjusts the frequency of the crystal oscillator based on $2F_d$, to avoid generating twice the Doppler frequency shift value at the receive end, so that an offset value of a received signal at the receive end is reduced, to zero or near zero.

In another case, $F1=F_{offset}+2F_d$, or $F1=F_{offset}+2(\alpha*(TA(t+2\Delta t)-TA(t+\Delta t))-\beta(TA(t+\Delta t)-TA(t)))*\Delta t$, or $F1=F_{offset}+2(\alpha*(TA(t+2\Delta t)-TA(t+\Delta t))-(TA(t+\Delta t)-TA(t)))*\Delta t$. $F_{offset}$ represents a common component of a Doppler frequency shift value of a terminal in a cell. For details, refer to the foregoing description of $F_{offset}$. In this case, the terminal device adjusts the frequency of the crystal oscillator by using $2F_d$ with reference to the common component of the Doppler frequency shift value of the terminal in the cell, so that frequency compensation accuracy can be further improved.

In still another case, $F1=F_{offset}+2F_d+F3$, or $F1=F_{offset}+2(\alpha*(TA(t+2\Delta t)-TA(t+\Delta t))-\beta(TA(t+\Delta t)-TA(t)))*\Delta t+F3$, or $F1=F_{offset}+2(\alpha*(TA(t+2\Delta t)-TA(t+\Delta t))-(TA(t+\Delta t)-TA(t)))*\Delta t+F3$. F3 represents a frequency offset value that is determined by a satellite based on an uplink reference signal and that is indicated by the satellite. After receiving an uplink signal (for example, the uplink reference signal), the satellite determines the frequency offset value, and may indicate the adjusted frequency offset value F3 to the terminal device in a closed-loop manner. In this case, the terminal device further adjusts the frequency of the crystal oscillator by using $2F_d$ with reference to the common component of the Doppler frequency shift value of the terminal in the cell and a frequency offset value indicated by a satellite in a closed-loop manner, so that frequency compensation accuracy can be further improved.

In yet another case, $F1=2F_d+F3$, or $F1=2(\alpha*(TA(t+2\Delta t)-TA(t+\Delta t))-\beta(TA(t+\Delta t)-TA(t)))*\Delta t+F3$, or $F1=2(\alpha*(TA(t+2\Delta t)-TA(t+\Delta t))-(TA(t+\Delta t)-TA(t)))*\Delta t+F3$. In this case, the terminal device adjusts the frequency of the crystal oscillator by using $2F_d$ with reference to the frequency offset value indicated by the satellite in a closed-loop manner, so that frequency compensation accuracy can be further improved.

The terminal adjusts the frequency of the crystal oscillator by using twice the Doppler frequency shift value determined by using the weighted change rate of the change rate of the TA, so that the offset value of the uplink signal received at the receive end can be reduced, even to zero or near zero, thereby improving frequency compensation accuracy.

The terminal device may perform, by using the frequency offset value, frequency pre-compensation on the to-be-sent uplink signal. The frequency offset value may be the Doppler frequency shift value, or may be a combination of the Doppler frequency shift value and another offset value.

Usually, in a downlink synchronization process, if the terminal device does not change the frequency of the crystal oscillator of the terminal device, and when an uplink signal is sent, frequency pre-compensation is performed in a digital domain, and an offset value greater than twice the frequency of the crystal oscillator is generated at the receive end. For example, the center frequency is Fc=3.5 G, the frequency offset of the crystal oscillator is 0.2, the Doppler frequency shift value $F_d=0.8$, a frequency of the downlink signal received by the terminal device is 3.5+0.6=4.1, and a deviation of 0.6 is detected. The terminal device performs compensation of 0.6 on the sent signal in the digital domain, and a frequency of the actually sent signal is 3.7−0.6=3.1. The frequency of the signal received at the receive end is 3.1+0.8=3.9. A difference between the frequency offset and the center frequency of 3.5 is 0.4, which is twice the offset value of the frequency offset of the crystal oscillator.

When receiving the downlink signal from the satellite, the terminal device may estimate a frequency offset value $F_{DL}$ based on the downlink signal, where $F_{DL}$ represents a difference between a frequency of the downlink signal received from the satellite and a frequency of the downlink signal that should be received according to an agreement, or an absolute value of the difference. $F_{DL}$ includes the frequency offset of the crystal oscillator and the Doppler frequency shift that are generated by hardware of the terminal device. If the terminal device performs compensation on the uplink signal by using $F_{DL}$, an offset value that is twice the frequency offset of the crystal oscillator is generated at the receive end. In this embodiment of this application, before an uplink signal is sent, it is considered that the to-be-sent uplink signal is pre-compensated in advance by using an offset value that is twice the frequency offset of the crystal oscillator, to avoid generating the offset value that is twice the frequency offset of the crystal oscillator at a receive end.

The terminal device may determine the Doppler frequency shift value based on the weighted change rate of the change rate of the TA, and determine a value of the frequency offset of the crystal oscillator Fosc based on $F_{DL}$ minus the Doppler frequency shift value $F_d$, that is, Fosc=$F_{DL}$−$F_d$. Frequency compensation is performed on the to-be-sent uplink signal by using $F_{DL}$ with reference to the offset value $F_{DL}$−2Fosc of twice the frequency offset of the crystal oscillator. In the following formula, $F_{DL}$ is a positive value.

Frequency compensation may be performed on a to-be-sent uplink signal according to Formula (4).

$$F=F0-F1 \quad \text{Formula (4)}$$

In Formula (4), F represents a compensated frequency, F0 represents a frequency before compensation, and F1 represents a frequency offset value.

In one case, F1=$F_{DL}$−2Fosc, where Fosc represents the frequency offset of the crystal oscillator, $F_{DL}$=Fosc+$F_d$, Fosc=$F_{DL}$−$F_d$, and F1=$F_{DL}$−2Fosc=$F_{DL}$−2($F_{DL}$−$F_d$)=−$F_{DL}$+2$F_d$, or F1=−$F_{DL}$+2($\alpha$*(TA(t+2$\Delta$t)−TA(t+$\Delta$t))−$\beta$(TA(t+$\Delta$t)−TA(t)))*$\Delta$t or F1=−$F_{DL}$+2($\alpha$*(TA(t+2$\Delta$t)−TA(t+$\Delta$t))−(TA(t+$\Delta$t)−TA(t)))*$\Delta$t.

For example, the frequency offset value determined by the terminal device based on the downlink signal received from the satellite is 3 Hz, the Doppler frequency shift value is 2 Hz, the frequency offset value F1 is −3+2*2=1 Hz, and the frequency of the uplink signal to be sent by the terminal device is 20 Hz. The compensated frequency is 20−1=19 Hz.

In another case, F1=$F_{offset}$+(−$F_{DL}$+2$F_d$), or F1=$F_{offset}$+$F_{DL}$+2($\alpha$*(TA(t+2$\Delta$t)−TA(t+$\Delta$t))−$\beta$(TA(t+$\Delta$t)−TA(t)))*$\Delta$t, or F1=$F_{offset}$+$F_{DL}$+2($\alpha$*(TA(t+2$\Delta$t)−TA(t+$\Delta$t))−(TA(t+$\Delta$t)−TA(t)))*$\Delta$t. $F_{offset}$ represents a common component of a Doppler frequency shift value of a terminal in a cell. For details, refer to the foregoing description of $F_{offset}$. In this case, the terminal device further determines a frequency offset value with reference to the common component of the Doppler frequency shift value of the terminal in the cell, so that frequency compensation accuracy can be further improved.

In still another case, F1=$F_{offset}$+(−$F_{DL}$+2$F_d$)+F3, or F1=$F_{offset}$+$F_{DL}$+2($\alpha$*(TA(t+2$\Delta$t)−TA(t+$\Delta$t))−$\beta$(TA(t+$\Delta$t)−TA(t)))*$\Delta$t+F3, or F1=$F_{offset}$+$F_{DL}$+2($\alpha$*(TA(t+2$\Delta$t)−TA(t+$\Delta$t))−(TA(t+$\Delta$t)−TA(t)))*$\Delta$t+F3. F3 represents a frequency offset value that is determined by a satellite based on an uplink reference signal and that is indicated by the satellite. After receiving an uplink signal (for example, the uplink reference signal), the satellite determines the frequency offset value, and may indicate the adjusted frequency offset value F3 to the terminal device in a closed-loop manner. In this case, the terminal device further determines a final frequency offset value with reference to the common component of the Doppler frequency shift value of the terminal in the cell and a frequency offset value indicated by a satellite in a closed-loop manner, so that frequency compensation accuracy can be further improved.

In the foregoing formula of $F_{offset}$ in this embodiment of this application, $F_{offset}$ represents a common component of a Doppler frequency shift value of a terminal in a cell. In a possible design, if $F_{offset}$ is equal to 0, compensation may be performed on the satellite side based on $F_{offset}$. In another possible design, a part of pre-compensation may be performed on both the satellite side and the terminal device side, so that a sum of the pre-compensation is equal to $F_{offset}$.

Figure 7:
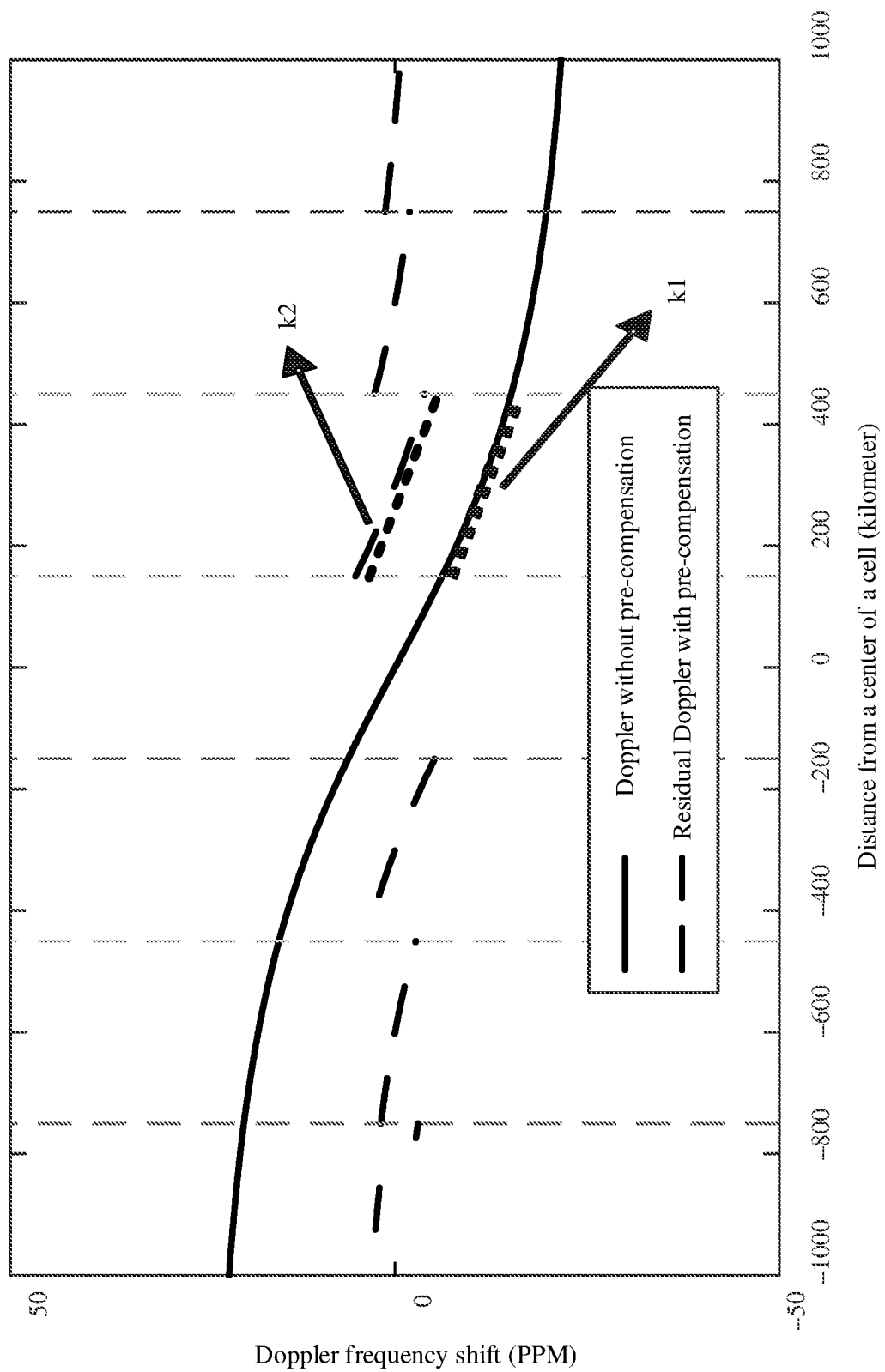
FIG. 7 is a schematic diagram of a Doppler change rate based on pre-compensation and non-pre-compensation according to an embodiment of this application.

In addition, in this embodiment of this application, if the satellite side performs pre-compensation on the common component of the Doppler frequency shift value of the terminal in the cell, or the terminal performs post-compensation based on the common component, calculation of the Doppler change rate by the terminal is not affected. In other words, accuracy of determining Kd based on the weighted change rate of the change rate of the TA in this embodiment of this application is not affected. FIG. 7 shows a slope of a curve, namely, the Doppler change rate, of a Doppler value change based on pre-compensation and non-pre-compensation, where a solid line represents a Doppler curve without pre-compensation, and a dashed line represents a Doppler curve after pre-compensation. It can be learned that the Doppler change rate does not change in a case of pre-compensation (transmit end compensation) or post-compensation (receive end compensation). A slope k1 of a solid line changes to k2 after Doppler pre-compensation, and the slope does not change. Therefore, the Doppler change rate determined based on the weighted change rate of the change rate of the TA is also applicable in a case of Doppler pre-compensation.

In the foregoing process of performing frequency compensation on an uplink signal or a downlink signal or adjusting the frequency of the crystal oscillator, a value of the frequency offset value is positive, and F=F0−F1. Optionally, the value of the frequency offset value may be alternatively negative, and is denoted as F1'. F1'=−F1. Then, F=F0+F1'.

In this embodiment of this application, the foregoing formula is an example, and a relationship between the parameters may be represented by using an equivalent expression form of the foregoing formula.

Figure 8A:
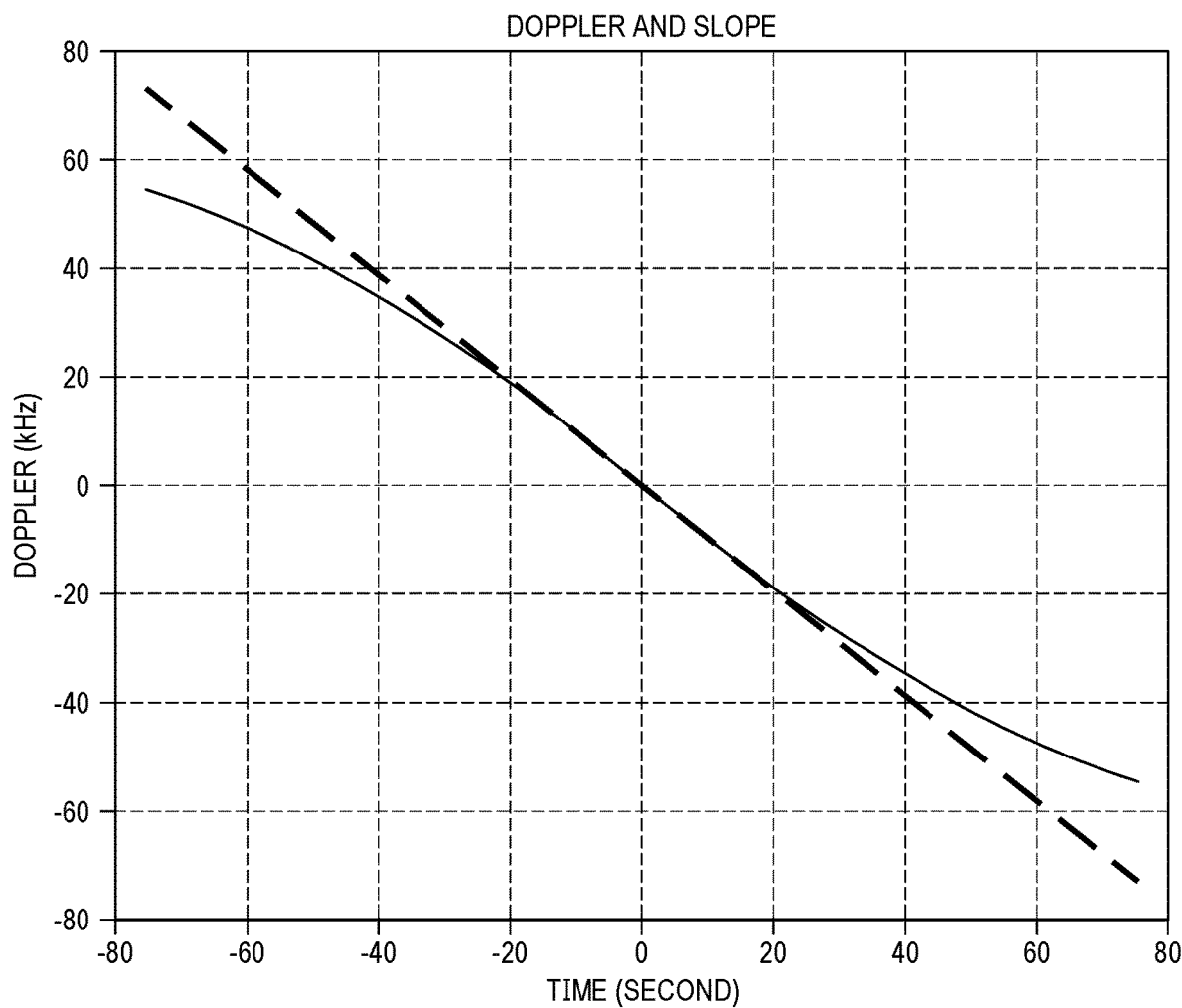
FIG. 8a is a schematic diagram of a Doppler frequency shift value calculated at a nadir point and an actually generated Doppler frequency shift value according to an embodiment of this application.
Figure 8B:
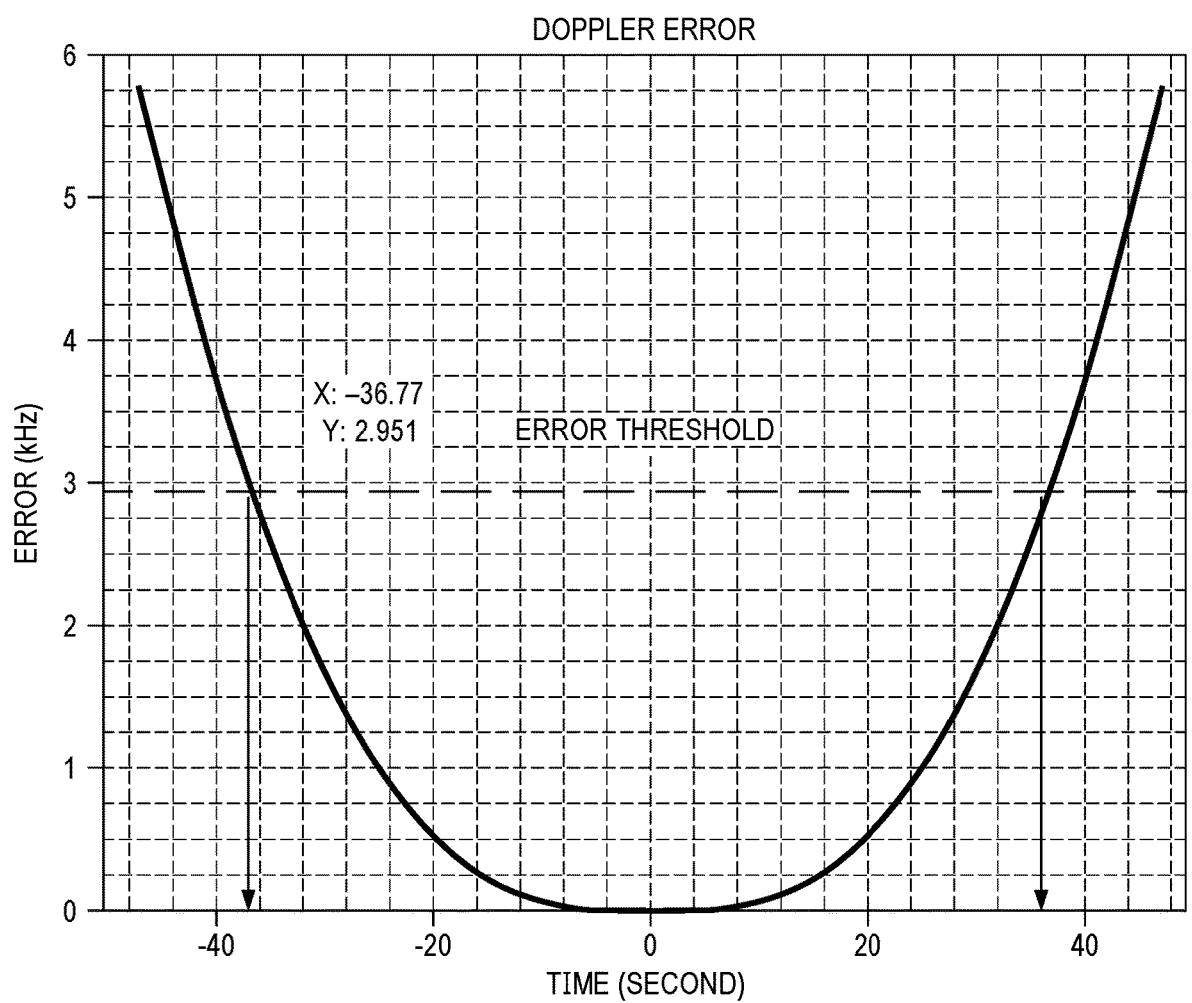
FIG. 8b is a schematic diagram of an error in performing Doppler estimation based on a Doppler change rate according to an embodiment of this application.

As shown in FIG. 8a, a straight line represents that a Doppler frequency shift value determined based on a Doppler change rate changes with a change of an elevation angle, and a curve represents an actually generated Doppler frequency shift value. In FIG. 8b, a solid line is an error curve between the Doppler frequency shift value determined based on the Doppler change rate and the actually generated Doppler frequency shift value, and a dashed line represents a value corresponding to an error tolerance. After determining the frequency offset value, the terminal performs frequency compensation based on the frequency offset value. It can be learned from FIG. 8a and FIG. 8b that the terminal further needs to update the frequency offset value. How often the terminal needs to update the frequency offset value is related to a type of a satellite. Different types of satellites have different requirements for frequency tracking accuracy. Specifically, there is a specific error between the Doppler frequency shift value determined by the terminal device based on the Doppler change rate and the actual Doppler frequency shift value, for example, a difference between the straight line and the curve in FIG. 8a. The error is related to a period in which the terminal device updates the Doppler change rate. Because a Doppler change rate of a nadir point is the largest, frequency of estimating the Doppler change rate by the terminal device at the nadir point is the largest. FIG. 8b illustrates a nadir point at which an error generated by using one Doppler change rate changes with time. The Doppler change rate can be updated according to error accuracy requirements. Update frequency is related to the type of the satellite. Different satellite moving speeds have different update frequency. The figure shows that if a change rate at the nadir point is used by the user under the nadir point, and it is assumed that an error tolerance is 3 kHz, the Doppler change rate needs to be updated within approximately 35 s when the satellite flies overhead.

It should be noted that examples in the application scenarios in this application merely show some possible implementations, to help better understand and describe the method in this application. A person skilled in the art may obtain examples of some evolution forms according to the reference signal indication method provided in this application.

To implement functions in the method provided in embodiments of this application, a terminal device may include a hardware structure and/or a software module, to implement the functions in a form of a hardware structure, a software module, or a hardware structure and a software module. Whether a function in the foregoing functions is performed by the hardware structure, the software module, or the combination of the hardware structure and the software module depends on specific applications and design constraint conditions of the technical solutions.

Figure 9:
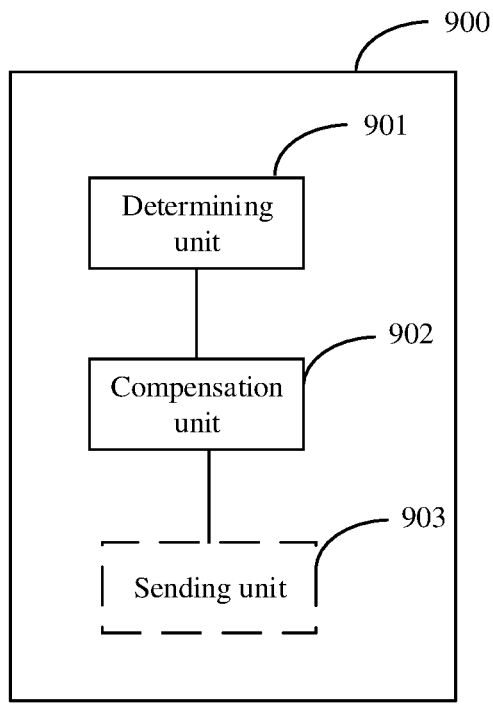
FIG. 9 is a first schematic diagram of a structure of a frequency compensation apparatus according to an embodiment of this application.

As shown in FIG. 9, based on a same technical concept, an embodiment of this application further provides a frequency compensation apparatus 900. The frequency compensation apparatus 900 may be a terminal device, an apparatus in a terminal device, or an apparatus that can match and be used with a terminal device. In a design, the frequency compensation apparatus 900 may include modules that are in a one-to-one correspondence with methods/operations/steps/actions performed by the terminal device in the foregoing method embodiments. The modules may be hardware circuits or software, or may be implemented by hardware circuits in combination with software. In a design, the frequency compensation apparatus 900 may include a determining unit 901 and a compensation unit 902.

The determining unit 901 is configured to determine a Doppler frequency shift value $F_d$ based on a weighted change rate of a change rate of a timing advance TA.

The compensation unit 902 is configured to perform frequency compensation based on the Doppler frequency shift value $F_d$ determined by the determining unit.

Optionally, the Doppler frequency shift value $F_d$ is determined by using a formula: $F_d=Kd*\Delta t$, where Kd represents a change rate of the Doppler frequency shift value; and the change rate Kd of the Doppler frequency shift value and the TA meet the following formula or an equivalent expression form of the following formula: $Kd=\alpha*(TA(t+2\Delta t)-TA(t+\Delta t))-\beta(TA(t+\Delta t)-TA(t))$, where t represents a time, $\Delta t$ represents a unit time, and $\alpha$ and $\beta$ represent weighting coefficients.

Optionally, when performing frequency compensation based on the Doppler frequency shift value $F_d$, the compensation unit 902 is configured to: perform frequency compensation on a downlink signal according to F=F0−F1, where F represents a compensated frequency, F0 represents a frequency before compensation, F1 represents a frequency offset value, and F1 and $F_d$ meet any one of the following formulas or an equivalent expression form of any one of the following formulas: $F1=F_d$, $F1=F_{offset}+F_d$, or $F1=F_{offset}+F_d+F2$, where $F_{offset}$ represents a common component of a Doppler frequency shift value of a terminal in a cell, and F2 represents a frequency offset value determined based on a downlink reference signal.

Optionally, when performing frequency compensation based on the Doppler frequency shift value $F_d$, the compensation unit 902 is configured to: perform frequency compensation on a to-be-sent uplink signal according to F=F0−F1, where F represents a compensated frequency, F0 represents a frequency before compensation, F1 represents a frequency offset value, and F1 and $F_d$ meet any one of the following formulas or an equivalent expression form of any one of the following formulas: $F1=-F_{DL}+2F_d$, $F1=F_{offset}+(-F_{DL}+2F_d)$, or $F1=F_{offset}+(-F_{DL}+2F_d)+F3$, where $F_{DL}$ represents a frequency offset value determined based on a downlink received signal, $F_{offset}$ represents a common component of a Doppler frequency shift value of a terminal in a cell, and F3 represents a frequency offset value that is determined by a network device based on an uplink reference signal and that is indicated by the network device.

Optionally, when performing frequency compensation based on the Doppler frequency shift value $F_d$, the compensation unit 902 is configured to adjust a frequency of a crystal oscillator based on F1; and the frequency compensation apparatus 900 further includes a sending unit 903, configured to send an uplink signal based on the frequency of the crystal oscillator adjusted by the compensation unit 902, where F1 and $F_d$ meet any one of the following formulas or an equivalent expression form of any one of the following formulas:

$$F1=2F_d;$$

$$F1=F_{offset}+2F_d; \text{ or}$$

$$F1=F_{offset}+2F_d+F3,$$

where $F_{offset}$ represents a common component of a Doppler frequency shift value of a terminal in a cell, and F3 represents a frequency offset value that is determined by a network device based on an uplink reference signal and that is indicated by the network device.

Division into the modules in this embodiment of this application is an example, is merely logical function division, and may be other division during actual implementation. In addition, function modules in embodiments of this application may be integrated into one processor, or each of the modules may exist alone physically, or two or more modules may be integrated into one module. The integrated module may be implemented in a form of hardware, or may be implemented in a form of a software function module.

Figure 10:
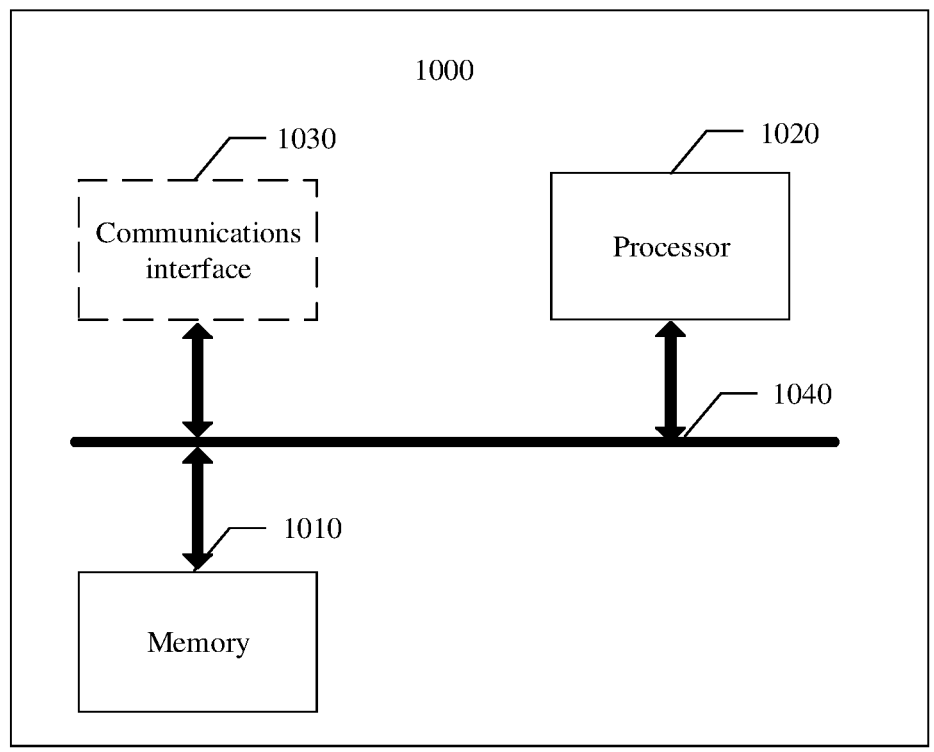
FIG. 10 is a second schematic diagram of a structure of a frequency compensation apparatus according to an embodiment of this application.

FIG. 10 shows a frequency compensation apparatus 1000 according to an embodiment of this application, configured to implement the function of the terminal device in the foregoing method. When the function of the terminal device is implemented, the apparatus may be a terminal device, an apparatus in a terminal device, or an apparatus that can be used together with a terminal device. The frequency compensation apparatus may be a chip system. In this embodiment of this application, the chip system may include a chip, or may include a chip and another discrete component. The frequency compensation apparatus 1000 includes at least one processor 1020, configured to implement the function of the terminal device in the method according to embodiments of this application. The frequency compensation apparatus 1000 may further include at least one memory 1010. The memory 1010 is configured to store program instructions and/or data. The memory 1010 is coupled to the processor 1020. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1020 may cooperate with the memory 1010. The processor 1020 may execute the program instructions stored in the memory 1010. At least one of the at least one memory may be included in the processor. The processor 1020 may be implemented by using a logic circuit, and a specific form includes but is not limited to any one of the following.

The processor 1020 may be a central processing unit (CPU), a network processor (NP), or a combination of the CPU and the NP.

The processor 1020 may be implemented by using a logic circuit. A specific form of the foregoing logic circuit includes but is not limited to any one of the following: a field-programmable gate array (FPGA), a very high speed integrated circuit hardware description language (VHDL) circuit, or a complementary pass transistor logic (CPL) circuit.

The processor 1020 is configured to: determine a Doppler frequency shift value $F_d$ based on a weighted change rate of a change rate of a timing advance TA; and perform frequency compensation based on the determined Doppler frequency shift value $F_d$ The processor 1020 is further configured to perform other operations and steps performed by the terminal device in the foregoing method embodiments.

The frequency compensation apparatus 1000 may further include a communications interface 1030. The communications interface 1030 may be a transceiver, a circuit, a bus, a module, or another type of communications interface, and is configured to communicate with another device by using a transmission medium. For example, the communications interface 1030 is configured to communicate with another device by using an apparatus in the frequency compensation apparatus 1000.

In this embodiment of this application, a specific connection medium between the communications interface 1030, the processor 1020, and the memory 1010 is not limited. In this embodiment of this application, the memory 1010, the processor 1020, and the communications interface 1030 are connected by using a bus 1040 in FIG. 10, and the bus is represented by a bold line in FIG. 10. A connection manner between other components is schematically described, and is not limited thereto. The bus may be classified into an address bus, a data bus, a control bus, or the like. For ease of representation, only one bold line is used to represent the bus in FIG. 10, but this does not mean that there is only one bus or only one type of bus.

In this embodiment of this application, the memory 1010 may be a non-volatile memory, for example, a hard disk drive (HDD) or a solid-state drive (SSD), or may be a volatile memory, for example, a random access memory (RAM). The memory is any other medium that can be configured to carry or store expected program code in a form of instructions or a data structure and that can be accessed by a computer, but is not limited thereto. The memory in this embodiment of this application may be alternatively a circuit or any other apparatus that can implement a storage function, and is configured to store program instructions and/or data.

Some or all of the operations and functions performed by the terminal device according to the foregoing method embodiments of this application may be completed by using a chip or an integrated circuit.

To implement functions of the frequency compensation apparatus described in FIG. 9 or FIG. 10, an embodiment of this application further provides a chip, including a processor, configured to support the frequency compensation apparatus in implementing the function of the terminal device in the foregoing method embodiments. In a possible design, the chip is connected to a memory or the chip includes the memory, and the memory is configured to store program instructions and data that are necessary for the frequency compensation apparatus.

An embodiment of this application provides a computer-readable storage medium that stores a computer program. The computer program includes instructions used to perform the foregoing method embodiments.

An embodiment of this application provides a computer program product including instructions. When the computer program product is run on a computer, the computer is enabled to perform the foregoing method embodiments.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may be alternatively stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

Although some embodiments of this application have been described, a person skilled in the art can make changes and modifications to these embodiments once they learn of the basic inventive concept. Therefore, the following claims are intended to be construed as to cover the preferred embodiments and all changes and modifications falling within the scope of this application.

It is clear that a person skilled in the art can make various modifications and variations to embodiments of this application without departing from the scope of embodiments of this application. In this way, this application is intended to cover these modifications and variations of embodiments of this application provided that they fall within the scope of protection defined by the following claims and their equivalent technologies.

What is claimed is:

1. A method, comprising:
   determining, by a terminal, a Doppler frequency shift value $F_d$ based on a weighted change rate of a change rate of a timing advance (TA) of the terminal; and
   performing, by the terminal, frequency compensation for wireless communications based on the Doppler frequency shift value $F_d$; and
   wherein the Doppler frequency shift value $F_d$ is determined using a formula: $F_d = Kd*\Delta t$, wherein Kd represents a change rate of the Doppler frequency shift value $F_d$; and
   the change rate Kd of the Doppler frequency shift value $F_d$ and the TA meet: $Kd=\alpha*(TA(t+2\Delta t)-TA(t+\Delta t))-\beta(TA(t+\Delta t)-TA(t))$, wherein t represents a time, $\Delta t$ represents a unit time, and $\alpha$ and $\beta$ represent weighting coefficients.

2. The method according to claim 1, wherein performing the frequency compensation based on the Doppler frequency shift value $F_d$ comprises:
   performing, by the terminal, frequency compensation on a downlink signal according to F=F0-F1, wherein
   F represents a compensated frequency of the downlink signal, F0 represents a frequency of the downlink signal before compensation, F1 represents a frequency offset value, and F1 and $F_d$ meet: $F1=F_d$, $F1=F_{offset}+F_d$, or $F1=F_{offset}+F_d+F2$, wherein
   $F_{offset}$ represents a common component of a Doppler frequency shift value of the terminal in a cell, and F2 represents a frequency offset value determined based on a downlink reference signal.

3. The method according to claim 1, wherein performing the frequency compensation based on the Doppler frequency shift value $F_d$ comprises:
   performing, by the terminal, frequency compensation on a to-be-sent uplink signal of the terminal according to F=F0-F1, wherein
   F represents a compensated frequency of the to-be-sent uplink signal, F0 represents a frequency of the to-be-sent uplink signal before compensation, F1 represents a frequency offset value, and F1 and $F_d$ meet: $F1=-F_{DL}+2F_d$, $F1=F_{offset}+(-F_{DL}+2F_d)$, or $F1=F_{offset}+(-F_{DL}+2F_d)+F3$, wherein $F_{DL}$ represents a frequency offset value determined based on a received downlink signal, $F_{offset}$ represents a common component of a Doppler frequency shift value of the terminal in a cell, and F3 represents a frequency offset value that is determined by a network device based on an uplink reference signal and that is indicated by the network device.

4. The method according to claim 1, wherein performing the frequency compensation based on the Doppler frequency shift value $F_d$ comprises:
   adjusting, by the terminal, a frequency of a crystal oscillator based on F1, and sending an uplink signal based on the adjusted frequency of the crystal oscillator, wherein
   F1 and $F_d$ meet:

$F1=2F_d;$ $F1=F_{offset}+2F_d;$ or $F1=F_{offset}+2F_d+F3,$ wherein $F_{offset}$ represents a common component of a Doppler frequency shift value of the terminal in a cell, and F3 represents a frequency offset value that is determined by a network device based on an uplink reference signal and that is indicated by the network device.

5. An apparatus, comprising:
   at least one processor and at least one non-transitory memory, wherein
   the at least one non-transitory memory is configured to store program instructions; and
   when executing the program instructions, the at least one process is caused to:
   determine a Doppler frequency shift value Fa based on a weighted change rate of a change rate of a timing advance (TA) of a terminal; and
   perform frequency compensation for wireless communications based on the Doppler frequency shift value $F_d$; and
   wherein the Doppler frequency shift value Fa is determined using a formula: $F_d=Kd*\Delta t$, wherein Kd represents a change rate of the Doppler frequency shift value $F_d$; and
   the change rate Kd of the Doppler frequency shift value $F_d$ and the TA meet: $Kd=\alpha*(TA(t+2\Delta t)-TA(t+\Delta t))-\beta(TA(t+\Delta t)-TA(t))$, wherein t represents a time, $\Delta t$ represents a unit time, and $\alpha$ and $\beta$ represent weighting coefficients.

6. The apparatus according to claim 5, wherein performing the frequency compensation based on the Doppler frequency shift value $F_d$ comprises:
   performing frequency compensation on a downlink signal according to F=F0-F1, wherein
   F represents a compensated frequency of the downlink signal, F0 represents a frequency of the downlink signal before compensation, F1 represents a frequency offset value, and F1 and $F_d$ meet: $F1=F_d$, $F1=F_{offset}+F_d$, or $F1=F_{offset}+F_d+F2$, wherein
   $F_{offset}$ represents a common component of a Doppler frequency shift value of the terminal in a cell, and F2 represents a frequency offset value determined based on a downlink reference signal.

7. The apparatus according to claim 5, wherein performing the frequency compensation based on the Doppler frequency shift value $F_d$ comprises:
   performing frequency compensation on a to-be-sent uplink signal of the terminal according to F=F0-F1, wherein
   F represents a compensated frequency of the to-be-sent uplink signal, F0 represents a frequency of the to-be-sent uplink signal before compensation, F1 represents a frequency offset value, and F1 and $F_d$ meet: $F1=-F_{DL}+2F_d$, $F1=F_{offset}+(-F_{DL}+2F_d)$, or $F1=F_{offset}+(-F_{DL}+2F_d)+F3$, wherein $F_{DL}$ represents a frequency offset value determined based on a received downlink signal, $F_{offset}$ represents a common component of a Doppler frequency shift value of the terminal in a cell, and F3 represents a frequency offset value that is determined by a network device based on an uplink reference signal and that is indicated by the network device.

8. The apparatus according to claim 5, wherein performing the frequency compensation based on the Doppler frequency shift value $F_d$, comprises:
   adjusting a frequency of a crystal oscillator based on F1; and
   sending an uplink signal based on the frequency of the crystal oscillator adjusted, wherein
   F1 and $F_d$ meet:

$F1=2F_d;$ $F1=F_{offset}+2F_d;$ or $F1=F_{offset}+2F_d+F3,$ wherein $F_{offset}$ represents a common component of a Doppler frequency shift value of the terminal in a cell, and F3 represents a frequency offset value that is determined by a network device based on an uplink reference signal and that is indicated by the network device.

9. The apparatus according to claim 5, wherein the apparatus is a chip or an integrated circuit of the terminal.

10. A non-transitory computer-readable storage medium storing computer-readable instructions, wherein when the computer-readable instructions are run on a communications apparatus, the communications apparatus is caused to:
determine a Doppler frequency shift value Fa based on a weighted change rate of a change rate of a timing advance (TA) of communications apparatus; and
perform frequency compensation for wireless communications of the communications apparatus based on the Doppler frequency shift value $F_d$; and
wherein the Doppler frequency shift value Fa is determined using a formula: $F_d$=Kd*Δt, wherein Kd represents a change rate of the Doppler frequency shift value $F_d$; and
the change rate Kd of the Doppler frequency shift value Fa and the TA meet: Kd=α*(TA(t+2Δt)−TA(t+Δt))−β(TA(t+Δt)−TA(t)), wherein t represents a time, Δt represents a unit time, and α and β represent weighting coefficient.

11. The computer-readable storage medium according to claim 10, wherein performing the frequency compensation based on the Doppler frequency shift value $F_d$ comprises:
performing frequency compensation on a downlink signal according to F=F0−F1, wherein
F represents a compensated frequency of the downlink signal, F0 represents a frequency of the downlink signal before compensation, F1 represents a frequency offset value, and F1 and $F_d$ meet: F1=$F_d$, F1=$F_{offset}$+$F_d$, or F1=$F_{offset}$+$F_d$+F2, wherein
$F_{offset}$ represents a common component of a Doppler frequency shift value of the communications apparatus in a cell, and F2 represents a frequency offset value determined based on a downlink reference signal.

12. The computer-readable storage medium according to claim 10, wherein performing the frequency compensation based on the Doppler frequency shift value $F_d$ comprises:
performing frequency compensation on a to-be-sent uplink signal of the communications apparatus according to F=F0−F1, wherein
F represents a compensated frequency of the to-be-sent uplink signal, F0 represents a frequency of the to-be-sent uplink signal before compensation, F1 represents a frequency offset value, and F1 and $F_d$ meet: F1=−$F_{DL}$+2$F_d$, F1=$F_{offset}$+(−$F_{DL}$+2$F_d$), or F1=$F_{offset}$+(−$F_{DL}$+2$F_d$)+F3, wherein $F_{DL}$ represents a frequency offset value determined based on a received downlink signal, $F_{offset}$ represents a common component of a Doppler frequency shift value of the communications apparatus in a cell, and F3 represents a frequency offset value that is determined by a network device based on an uplink reference signal and that is indicated by the network device.

13. The computer-readable storage medium according to claim 10, wherein performing the frequency compensation based on the Doppler frequency shift value $F_d$ comprises:
adjusting a frequency of a crystal oscillator based on F1; and
sending an uplink signal based on the frequency of the crystal oscillator adjusted, wherein
F1 and $F_d$ meet:

$$F1=2F_d;$$

$$F1=F_{offset}+2F_d; \text{ or}$$

$$F1=F_{offset}+2F_d+F3, \text{ wherein}$$

$F_{offset}$ represents a common component of a Doppler frequency shift value of the communications apparatus in a cell, and F3 represents a frequency offset value that is determined by a network device based on an uplink reference signal and that is indicated by the network device.

* * * * *

UNITED STATES PATENT AND TRADEMARK OFFICE
CERTIFICATE OF CORRECTION

PATENT NO. : 11,770,159 B2
APPLICATION NO. : 17/882200
DATED : September 26, 2023
INVENTOR(S) : Chen et al.

It is certified that error appears in the above-identified patent and that said Letters Patent is hereby corrected as shown below:

In the Claims

In Column 20, in Claim 5, Line 12, delete "Fa" and insert -- $F_d$ --.

In Column 20, in Claim 5, Line 18, delete "Fa" and insert -- $F_d$ --.

In Column 21, in Claim 10, Line 12, delete "Fa" and insert -- $F_d$ --.

In Column 21, in Claim 10, Line 18, delete "Fa" and insert -- $F_d$ --.

In Column 21, in Claim 10, Line 23, delete "Fa" and insert -- $F_d$ --.

Signed and Sealed this
Fifth Day of December, 2023

Katherine Kelly Vidal
*Director of the United States Patent and Trademark Office*